United States Patent

[11] 3,564,205

[72] Inventor Hugh J. Tyler
 Santa Ana, Calif.
[21] Appl. No. 878,336
[22] Filed Nov. 20, 1969
[45] Patented Feb. 16, 1971
[73] Assignee Robertshaw Controls Company
 Richmond, Va.

[54] TEMPERATURE CONTROL CIRCUITS
 16 Claims, 4 Drawing Figs.
[52] U.S. Cl. .................................................. 219/499,
 219/501
[51] Int. Cl. .................................................. H05b 1/02
[50] Field of Search ........................................ 219/499,
 501; 323/75 (EPH)

[56] References Cited
 UNITED STATES PATENTS
 3,149,224  9/1964  Horne et al. ................. 219/499

3,385,957  5/1968  Munson et al. ............... 219/501
3,478,532  11/1969  Cootey et al. ................. 219/501X Primary Examiner—Bernard A. Gilheany
Assistant Examiner—F. E. Bell
Attorneys—Auzville Jackson, Jr., Robert L. Marben and Anthony A. O'Brien ABSTRACT: Temperature control circuits including a bridge network having an output controlling a programmable unijunction transistor, a load controlling the heat supplied to an area, an SCR in series with the load and controlled by the programmable unijunction transistor in accordance with temperature sensed by a thermistor in the bridge network, and a unidirectionally conductive limiter diode connected with the bridge network to permit control operation on only the initial portion of positive half cycles of a supply voltage. Modifications of the temperature control circuits include means for increasing temperature differentials to require discrete temperature changes to energize and deenergize the load.

3,564,205

PATENTED FEB 16 1971

INVENTOR
Hugh J. Tyler

BY Anthony A. O'Brien
ATTORNEY

INVENTOR
Hugh J. Tyler

BY Anthony A. O'Brien
ATTORNEY 3,564,205

TEMPERATURE CONTROL CIRCUITS

BACKGROUND OF THE INVENTION

1. Field of the Invention

The present invention pertains to temperature control circuits and more particularly to such circuits for use in controlling the temperature in ovens.

2. Description of the Prior Art

While there are many known temperature control circuits, all of these circuits suffer from the disadvantages of either being complex and expensive or lacking in accuracy and reliable performance. One problem that has not been adequately overcome by prior art temperature control circuits is the accurate detection of temperature changes as sensed by temperature variable resistances. Another problem with prior art temperature control circuits is that they permit rapid cycling of heat controlling devices such as switches for electric heating systems and valves for fuel burning heating systems.

SUMMARY OF THE INVENTION

The present invention is summarized in a temperature control circuit including a load adapted to control the temperature in a space, a switch in series with the load and an AC supply, a resistance bridge having a temperature variable resistance in one leg thereof, a defector for receiving output signals from the bridge corresponding to the temperature in the space and controlling the operation of the switch, and limiter means connected across another leg of the resistance bridge, the limiter means being conductive in only one direction and having a predetermined breakdown voltage whereby the limiter means is triggered during the initial portion of positive half cycles of the supply voltage to permit control of the switch independent of supply voltage amplitude variations and the limiter means is nonconductive during negative half cycles of the supply voltage.

An object of the present invention is to accurately control the temperature in a space independent of supply voltage amplitude variations.

Another object of the present invention is to increase the temperature differential in a temperature control circuit to prevent rapid cycling of a heating control device.

A further object of the present invention is to utilize a unidirectionally conducting limiter diode across one leg of a resistance bridge in a temperature control circuit.

Some of the advantages of the present invention over the prior art are that a temperature variable resistance is self heated over the entire cycle of supply voltage to increase temperature differential, a single diode is utilized to provide half wave rectification and operation independent of supply voltage amplitude variations, and accurate operation is provided without rapid cycling of a heating control device.

Further objects and advantages of the present invention will become apparent from the following description of the preferred embodiments taken in conjunction with accompanying drawings.

DESCRIPTION OF THE PREFERRED EMBODIMENTS

Figure 1:
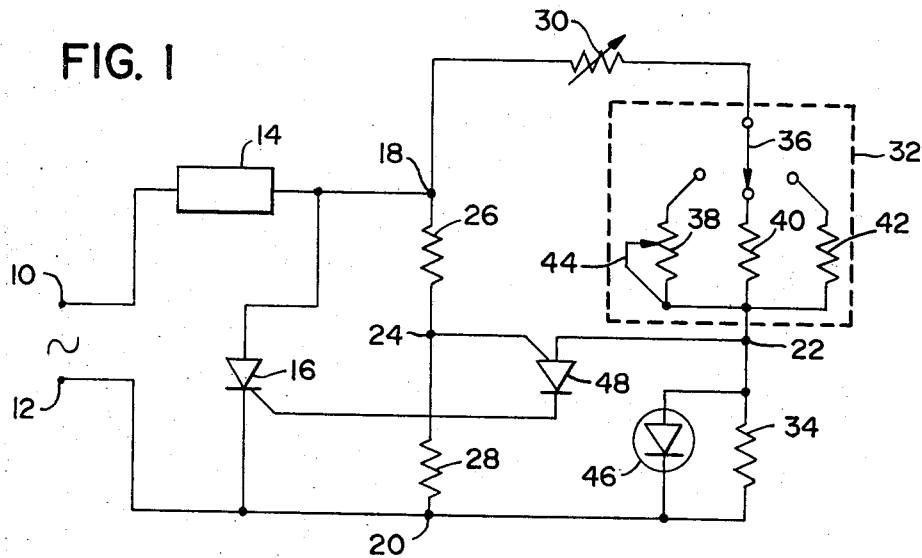
FIG. 1 is a schematic diagram of a temperature control circuit embodying the present invention.

A temperature control circuit according to the present invention is illustrated in FIG. 1 and includes a pair of supply terminals 10 and 12 adapted to receive a suitable AC supply voltage. A load 14 is in series with a silicon controlled rectifier (SCR) 16 across input terminals 10 and 12. The junction between load 14 and the anode of SCR 16 defines an input terminal 18 for a bridge network which further includes an input terminal 20 and output terminals 22 and 24. Input terminal 20 is connected with the cathode of SCR 16 such that the SCR is connected in shunt across the input terminals of the bridge.

A pair of fixed resistors 26 and 28 are in series between input terminals 18 and 20 of the bridge with the junction therebetween defining output terminal 24. A temperature sensing thermistor 30 is in series with a variable resistance network 32 and a fixed resistor 34 across input terminals 18 and 20 with the junction between resistive network 32 and resistor 34 defining output terminal 22. Resistors 26, 28 and 34 define resistive legs of the bridge and thermistor 30 and resistive network 32 define a fourth leg of the bridge. Resistive network 32 includes a switch 36 which is adapted to be connected with a plurality of resistors 38, 40 and 42 all of which have a first terminal adapted to be connected with switch 36 and a second terminal connected with output terminal 22. Resistor 38 has an adjustable tap 44 shunting a portion of the resistor to output terminal 22. Resistor 38 has an adjustable tap 44 shunting a portion of the resistor to output terminal 22. A unidirectionally conducting limiter diode 46 is in parallel with resistor 34 with its anode connected to output terminal 22 and its cathode connected to input terminal 20 and may be any diode having the characteristics of conducting in only one direction and only after a predetermined forward biasing voltage is placed thereacross, such as a four-layer or Schockley diode.

A programmable unijunction transistor (PUT) 48 has its anode connected with output terminal 22, its gate connected with output terminal 24 and its cathode connected with the gate of SCR 16. The operation of programmable unijunction transistors is well known in the art; however, in brief, the operation of the PUT 48 is such that the programmable unijunction transistor is conductive only on positive half cycles of the supply voltage and only when the anode voltage at output terminal 22 is greater than the gate voltage at output terminal 24.

The load 14 may be any type of control device such as a relay or valve, the operation of which controls the heating in a defined space, such as an oven. Thermistor 30 is disposed in the oven to sense the temperature therein and has a positive temperature coefficient of resistance such that the temperature in the oven corresponds to the resistance exhibited by thermistor 30. The switch 36 in resistive network 32 is moved to contact any one of the resistors 38, 40 and 42 which have varying resistances associated therewith defining various set temperatures for the oven. For instance, resistor 38 may constitute a conventional oven control such that tap 44 may be set by manipulation of a knob outside of the oven to set the desired oven operating temperature. Resistor 40 may have an extremely small resistance associated with automatic cleaning of the oven at very high oven temperatures and resistor 42 may correspond to a standard oven temperature for specific cooking methods, such as broiling.

In operation, the required set temperature for operation of the oven is determined by properly setting resistive network 32 such that the voltage at output terminal 22 will be greater than the voltage at output terminal 24 only when the temperature sensed by thermistor 30 is less than the desired operating temperature of the oven as set by resistive network 32. The supply voltage received at terminals 10 and 12 is supplied to input terminals 18 and 20 of the bridge; and, since resistors 26 and 28 are fixed, the voltage at output terminal 24 will be a substantially constant percentage of the supply voltage. The voltage at output terminal 22 will vary in accordance with the resistance of thermistor 30; and, due to the voltage divider effect between thermistor 30 and resistive network 32, and fixed resistor 34, the voltage at output terminal 22 will decrease as the temperature in the oven increases.

When the oven is initially turned on the temperature therein will be low and the voltage at output terminal 22 will be greater than the voltage at output terminal 24 due to the low resistance of thermistor 30 such that PUT 48 will be rendered conductive. The conduction of PUT 48 places a positive pulse on the gate of SCR 16 such that the SCR conducts to shunt the bridge and permit sufficient electrical energy to be received by load 14 to energize the control device and heat the oven. Once the temperature in the oven reaches the predetermined value, as set at resistive network 32, the voltage at output terminal 22 will fail to exceed the voltage at output terminal 24; and, accordingly, PUT 48 will be rendered nonconductive thereby rendering SCR 16 nonconductive. The resistance of the bridge is of such a value that load 14 will not receive sufficient electrical energy to energize the control device when SCR 16 is nonconducting; and, accordingly, the supply of heat to the oven will be terminated.

Figure 2:
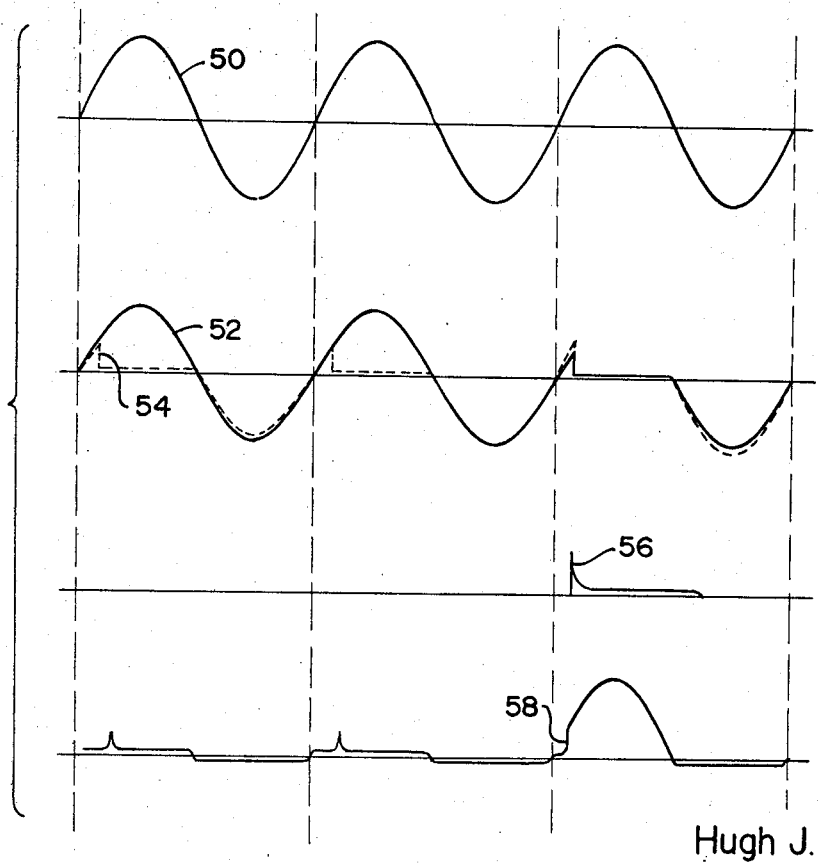
FIG. 2 is a set of curves for use in explaining the operation of the circuit of FIG. 1.

The operation of the temperature control circuit will be more particularly described with the aid of FIG. 2. The supply voltage received at terminals 10 and 12 is indicated at 50. A solid curve 52 is representative of the voltage at output terminal 24 of the bridge, and a dashed curve 54 is representative of the voltage at output terminal 22 of the bridge. A curve 56 represents the output on the cathode of PUT 48, and the voltage across load 14 is indicated at 58.

Assuming the temperature in the oven to be above the set temperature during the first cycle of supply voltage 50, it can be seen that the voltage 54 on output terminal 22 rises slower than the voltage on output terminal 24; and, consequently, PUT 48 will not be triggered. The predetermined voltage at which limiter diode 46 breaks down is set such that the limiter diode 46 will break down shortly after commencement of the positive half cycle of supply voltage 50; and, once limiter diode 46 breaks down, PUT 48 cannot be triggered and output terminal 22 is essentially clamped to terminal 12 shunting resistor 34. Since the anode voltage of PUT 48 will not have obtained a value greater than the gate voltage, PUT 48 will not be triggered during this cycle; and, accordingly, SCR 16 will remain nonconducting to permit only a small voltage to be applied to load 14, which voltage is insufficient to place load 14 in an energized state. During the negative half cycle of the supply voltage SCR 16, limiter diode 46, and PUT 48 block any reverse current flow therethrough, and thus no control action is provided during the negative half cycle.

The second cycle illustrated in FIG. 2 represents a condition where the oven temperature has decreased such that the voltage at output terminal 22 is approximately equal to the voltage at output terminal 24; however, PUT 48 is not triggered when the anode and gate voltages are equal.

The third cycle illustrated in FIG. 2 represents a condition where the oven temperature decreases below the set temperature such that the voltage at output terminal 22 rises faster than the voltage at output terminal 24 thereby triggering PUT 48 to provide a trigger pulse 56 to the gate of SCR 16. When SCR 16 is rendered conductive the voltage drop across load 14 is substantially increased as shown by curve 58 such that the load will be placed in its energized state to supply more heat to the oven. SCR 16 is rendered nonconducting on negative half cycles of supply voltage 50; however, the holding characteristic of load 14 is such that the load will remain in its energized state when SCR 16 is energized on consecutive positive half cycles. Thus, the oven will continue to be heated until the oven temperature as sensed by thermistor 30 increases to the set temperature such that the PUT 48 will not be triggered on positive half cycles thereby maintaining SCR 16 nonconductive and deenergizing load 14.

When the temperature in the oven is below the set temperature, limiter diode 46 is triggered at the beginning of each positive half cycle and continues to conduct for the remainder of the positive half cycle. The current through limiter diode 46 also flows through thermistor 30 and causes a small amount of self-heating dependent upon the design of the thermistor. When the oven temperature exceeds the set temperature, PUT 48 is triggered to render SCR 16 conductive which effectively shunts the bridge and reduces the amount of current flowing through thermistor 30. This action tends to increase the temperature differential of the temperature control circuit to provide more uniform cycling.

It may be seen that limiter diode 46 provides the function of utilizing only the initial portion of the positive half-cycle of the supply voltage for detecting oven temperature whereby the voltage detected is independent of the amplitude of the supply voltage and adverse effects from supply voltage variations are avoided, as well as the half wave rectifying function of rendering the temperature control system operable only on positive half cycles. Furthermore, the unidirectional conducting characteristic of limiter diode 46 provides the above described increase in temperature differential to reduce cycling of load 14.

Figure 3:
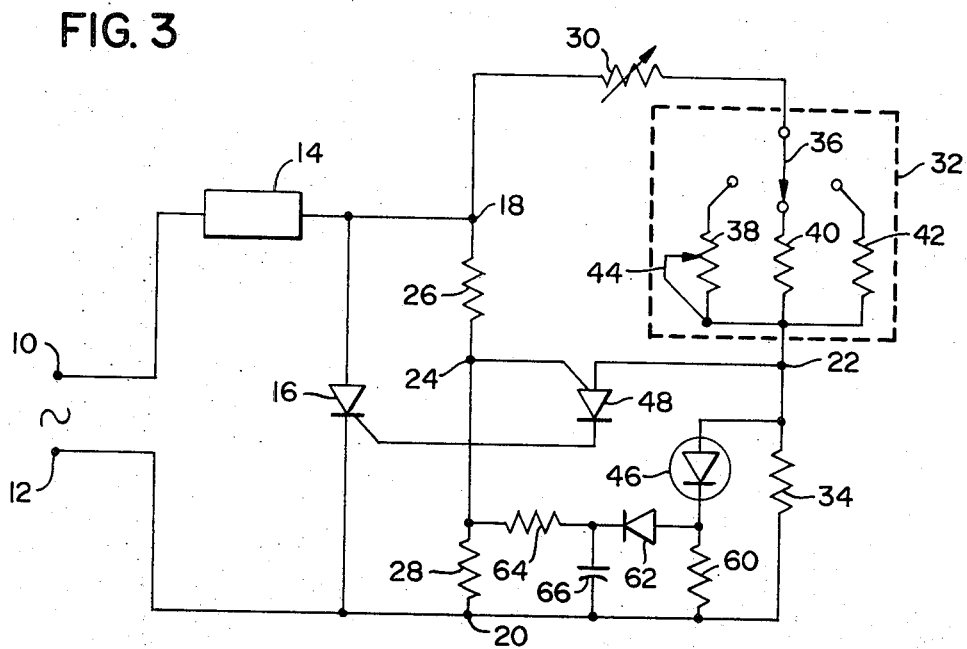
FIG. 3 is a schematic diagram of a modification of the circuit of FIG. 1.

A modification of the temperature control circuit of FIG. 1 is illustrated in FIG. 3 and components in the temperature control circuit of FIG. 3 which are identical to components of FIG. 1 are given identical reference numbers and are not described again.

A resistor 60 is in series with limiter diode 46 across resistor 34, and a diode 62 has its anode connected to the junction of resistor 60 and the cathode of limiter diode 46. The cathode of diode 62 is connected to output terminal 24 through a resistor 64 and to supply terminal 12 through a capacitor 66.

The operation of the modified temperature control circuit of FIG. 3 is the same as that previously described with respect to the embodiment of FIG. 1; however, the additional circuitry in the modification of FIG. 3 prevents rapid cycling of the load by requiring a small but definite resistance change at thermistor 30 in order to deenergize and energize load 14.

During positive half cycles of the supply voltage when the oven temperature is greater than the set temperature, limiter diode 46 will be triggered to pass a current through resistor 60 and develop a small positive voltage thereacross. The small positive voltage is utilized to charge capacitor 66 through diode 62 and the voltage on capacitor 66 is applied to output terminal 24 of the bridge through resistor 64. Thus, during operation of the circuit when the oven temperature is above the set temperature, the voltage applied to the gate of PUT 48 from output terminal 24 of the bridge is slightly higher than normal thereby requiring an increased voltage at output terminal 22 to trigger PUT 48. Once the oven temperature decreases sufficiently to trigger PUT 48, limiter diode 46 will be rendered nonconductive during the entire positive half cycles; and thus, the slight additional voltage added to output terminal 24 disappears. Consequently, due to the reduction in voltage at output terminal 24, the voltage required at output terminal 22 to render PUT 48 nonconductive is decreased by a small but definite amount thereby requiring a definite increase in oven temperature prior to deenergization of load 14. It can be seen, therefore, that the circuit of FIG. 3 prevents rapid cycling of load 14.

Figure 4:
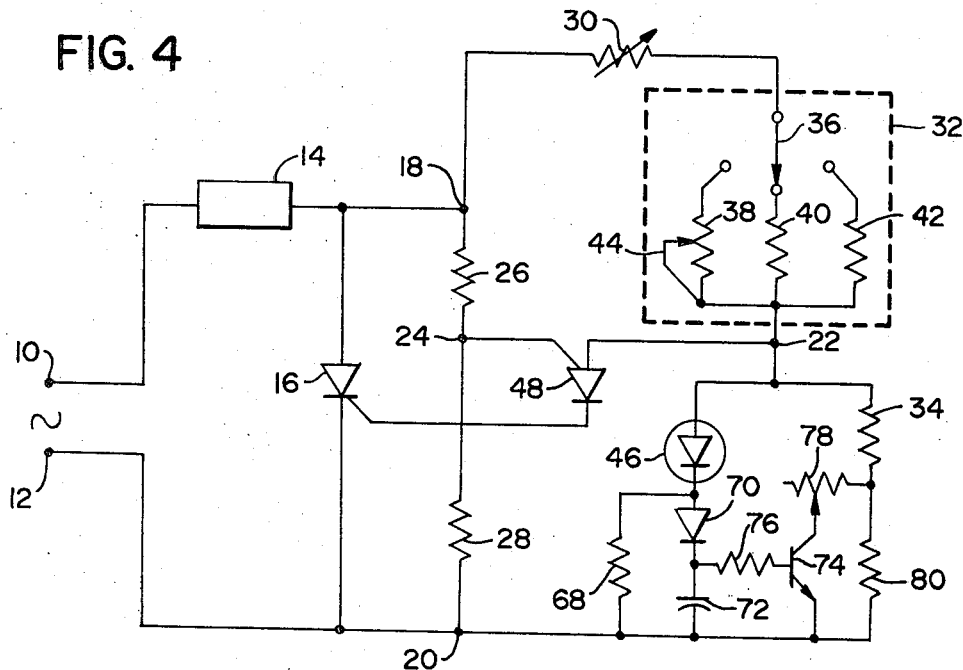
FIG. 4 is a schematic diagram of another modification of the circuit of FIG. 1.

Another modification of the temperature control circuit of FIG. 1 is illustrated in FIG. 4 and components in the temperature control circuit of FIG. 3 which are identical to components of FIG. 1 are given identical reference numbers and are not described again.

Limiter diode 46 is connected to supply terminal 12 through a resistor 68, and the series combination of a diode 70 and a capacitor 72 is connected in parallel with resistor 68. The anode of diode 70 is connected with the cathode of limiter diode 46 such that diodes 46 and 70 are similarly poled and the junction of capacitor 72 with the cathode of diode 70 is connected with the base of an NPN transistor 74 through a resistor 76. The emitter of transistor 74 is connected directly to supply terminal 12 and the collector of transistor 74 is connected with a tap for a variable resistor 78. Fixed resistor 34 is connected to ground through a resistor 80, and the variable resistor 78 and the emitter-collector path of transistor 74 shunt register 80.

The operation of the modification of FIG. 4 is essentially the same as that previously described with respect to the embodiment of FIG. 1; however, the embodiment of FIG. 4 provides a large adjustable temperature differential thereby rendering the circuit useful for those applications where the temperature control circuit is used to sense a temperature corresponding to a limit of safe operation. That is, once the load 14 is deenergized in response to temperature, it is desireable to permit the device being controlled, such as an oven, to cool considerably before commencing operating again.

When the temperature sensed by thermistor 30 is above the set temperature, a current is passed by limiter diode 46 after breakdown to develop a voltage across resistor 68 which is utilized to charge capacitor 72 through diode 70. The voltage across capacitor 72 applies a positive potential to the base of transistor 74 to render the transistor highly conductive thereby shunting resistor 80 and effectively reducing the voltage at output terminal 22. Once the temperature sensed by thermistor 30 decreases sufficiently to trigger PUT 48, limiter diode 46 will cease conducting to thereby render transistor 74 nonconducting and remove the shunt from across resistor 80 thereby immediately raising the voltage at output terminal 22. Consequently, a sufficient increase in the resistance of thermistor 30 is required before voltage at output terminal 22 will decrease sufficiently to render PUT 48 nonconductive and deenergize load 14. The temperature differential may be adjusted by movement of the tap on resistor 78 to vary the resistance shunted across resistor 80.

The increased temperature differentials provided by the modifications on FIGS. 3 and 4 are extremely reliable since the temperature differentials are provided without the use of mechanical contacts.

If so desired, the embodiments of FIGS. 1, 3 and 4 may be altered such that limiter diode 46 is connected across fixed resistor 26 to provide similar operation with the realization that the modified circuitry of FIGS. 3 and 4 may be rearranged to operate with limiter diode 46 in its new position.

In as much as the present invention is subject to many variations, modifications and changes in detail, it is intended that all matter contained in the foregoing description or shown in the accompanying drawings shall be interpreted as illustrative and not in a limited sense.

I claim:

1. A temperature control circuit comprising:
supply means adapted to receive an AC supply voltage;
load means connected with said supply means and adapted to control the temperature in a space;
switch means and controlling the energization of said load means;
a bridge network including input means connected with said supply terminal means to receive the supply voltage, output means, three resistive legs connected with said input means and said output means, and a fourth leg having temperature variable resistance means disposed in said space and connected with said input means and said output means such that output signals are provided at said output means corresponding to the temperature in said space;
detection means connected with output means to receive said output signal and assume a conductive or nonconductive state in accordance therewith, said detection means having an output connected with said switch means to control the operation thereof such that said means is conductive when said detection means is conductive to energize said load means; and
limiter means connected with said input means and said output means of said bridge network across one of said resistive legs, said limiter means being unidirectionally conductive and having a predetermined breakdown voltage whereby said limiter means is triggered during the initial portion of positive half cycles of the supply voltage to permit control of said switch means independent of amplitude variations of the supply voltage and said limiter means is nonconductive during negative half cycles of the supply voltage.

2. The invention as recited in claim 1 wherein storage means is connected with said limiter means to change the output signals at said output means independent of said temperature variable resistance means to increase the temperature differential of said temperature control circuit.

3. The invention as recited in claim 2 wherein said limiter means includes a unidirectionally conducting breakdown diode, and said storage means includes a capacitor connected in series with said breakdown diode.

4. The invention as recited in claim 3 wherein said capacitor is connected with said output means to increase the voltage of the output signals at said output means.

5. The invention as recited in claim 3 wherein said storage means includes shunt switch means shunting a portion of said one resistive leg and connected with said capacitor whereby said shunt switch means is conductive in response to voltage on said capacitor to decrease the voltage of the output signals at said output means.

6. The invention as recited in claim 5 wherein said shunt switch means is a transistor.

7. The invention as recited in claim 1 wherein said input means includes a first input terminal and a second input terminal, said output means includes a first output terminal and a second output terminal, said one resistive leg is connected between said first input terminal and said first output terminal, a second of said resistive legs is connected between said first input terminal and said second output terminal, a third of said resistive legs is connected between said second input terminal and said second output terminal, said fourth leg is connected between said second input terminal and said first output terminal, and said detection means is connected with said second output terminal to receive reference signals and with said first output terminal to receive output signals corresponding to the temperature in said space.

8. The invention as recited in claim 7 wherein said limiter means includes a unidirectionally conducting breakdown diode.

9. The invention as recited in claim 8 wherein a capacitor is connected in series with said breakdown diode through a second diode having an anode connected with the cathode of said breakdown diode and a cathode connected with a first side of said first input terminal.

10. The invention as recited in claim 9 wherein said cathode of said breakdown diode is connected with said first input terminal through a first resistor, said first side of said capacitor is connected with said second output terminal through a second resistor, said detection means includes a semiconductor switch having a first electrode connected with said first output terminal and a third electrode connected with said second output terminal and a third electrode connected with said switch means, said semiconductor switch being conductive during positive half cycles of the supply voltage when the voltage of the output signals at said first input terminal is greater than the voltage of the reference signals at said second output terminal whereby said capacitor is charged with said semiconductive switch is nonconductive to add voltage to the reference signals at said second output terminal.

11. The invention as recited in claim 10 wherein said semiconductor switch is a programmable unijunction transistor having an anode connected with said first output terminal, a gate connected with said second input terminal and a cathode, and said switch means is a silicon controlled rectifier having an anode connected with said second output terminal and said load means, a cathode connected with said first input terminal, and a gate connected with said cathode of said programmable unijunction transistor.

12. The invention as recited in claim 11 wherein said fourth leg of said bridge includes variable resistance means for setting the desired temperature to be maintained in said space.

13. The invention as recited in claim 9 wherein said cathode of said breakdown diode is connected with said first input terminal through a first resistor, said first side of said first capacitor is connected with the base of a transistor, the emitter-collector path of said transistor being connected across a portion of said one resistive leg of said bridge and said detection means includes semiconductor switch having a first electrode connected with said first output terminal, a second electrode connected with said second output terminal and a third electrode connected with said switch means, said semiconductor switch being conductive during positive half cycles of the supply voltage when the voltage of the output signals at said first input terminal is greater than the voltage of the reference signals at said second output terminal whereby said capacitor is charged when said semiconductor switch is nonconductive to bias said transistor into a conductive state to shunt said portion of said one resistive leg to decrease the voltage of the output signals at said first input terminal.

14. The invention as recited in claim 13 wherein said emitter-collector path of said transistor is connected across said portion of said one resistive leg through a second variable resistor and a third resistor is connected with said first side of said capacitor and the base of said transistor.

15. The invention as recited in claim 14 wherein said semiconductor switch is a programmable unijunction transistor having an anode connected with said first output terminal, a gate connected with said second input terminal and a cathode, and said switch means is a silicon controlled rectifier having an anode connected with said second input terminal and said load means, a cathode connected with said first input terminal, and a gate connected with said cathode of said programmable unijunction transistor.

16. The invention as recited in claim 15 wherein said fourth leg of said bridge includes variable resistance means for setting the desired temperature to be maintained in said space.